July 27, 1965

G. J. NOVAK 3,197,194

CLAMPING DEVICE FOR BROACHING MACHINE

Original Filed Feb. 26, 1960

INVENTOR
G. J. NOVAK
BY
a.c. Schwarz, Jr.
ATTORNEY

July 27, 1965    G. J. NOVAK    3,197,194
CLAMPING DEVICE FOR BROACHING MACHINE
Original Filed Feb. 26, 1960    2 Sheets-Sheet 2

INVENTOR
G. J. NOVAK
BY
A. C. Schwarz, Jr.
ATTORNEY

United States Patent Office 3,197,194
Patented July 27, 1965

3,197,194
CLAMPING DEVICE FOR BROACHING MACHINE
George J. Novak, Riverside, Ill., assignor to Western Electric Company, Incorporated, New York, N.Y., a corporation of New York
Original application Feb. 26, 1960, Ser. No. 11,199, now Patent No. 3,083,843, dated Apr. 2, 1963. Divided and this application Oct. 24, 1962, Ser. No. 232,683
6 Claims. (Cl. 269—32)

This invention relates to a clamping mechanism, and more particularly to a mechanism for effecting the actuation of a clamping member in a broaching machine.

This is a divisional application of patent application Serial No. 11,199 filed February 26, 1960 on "Mechanism for Loading and Separating Articles," now Patent No. 3,083,843 issued on April 2, 1963.

An object of the present invention is to provide an improved clamping mechanism.

Another object of the invention is to provide a novel mechanism for effecting the actuation of a clamping member in a machine.

A mechanism illustrating certain features of the invention as applied to a machine for broaching piece parts may include a clamping member movable along a predetermined path for effecting the clamping of the piece parts in a predetermined position in the machine with a predetermined pressure. Clamping movement is imparted to the member by a pair of opposed actuating elements having bevel surfaces engageable with the clamping member. One of the actuating elements is fixedly secured to a cylinder and the other actuating element is secured to a piston rod of the piston reciprocable within the cylinder. The actuating members are slidably mounted in a guideway on the machine and are supported thereby with the piston and the cylinder for floating longitudinal movement relative to each other and to the clamping member along a fixed axis disposed transversely of the path of movement of the clamping member. In response to the admission of compressed air into one end of the cylinder, the piston and cylinder are operated to cause the actuating elements to move toward each other and cause the beveled surfaces thereon to engage the clamping member therebetween and impart movement thereto to effect the clamping of the parts with a predetermined pressure.

Other objects, advantages and novel aspects of the invention will become apparent upon consideration of the following detailed description, in conjunction with the accompanying drawings, in which:

FIG. 3 is an enlarged fragmentary sectional view through the clamping mechanism taken on line 3—3 of FIG. 2; and FIG. 4 is an enlarged fragmentary sectional view similar to FIG. 3 showing elements of the mechanism in a different position.

Figure 2:
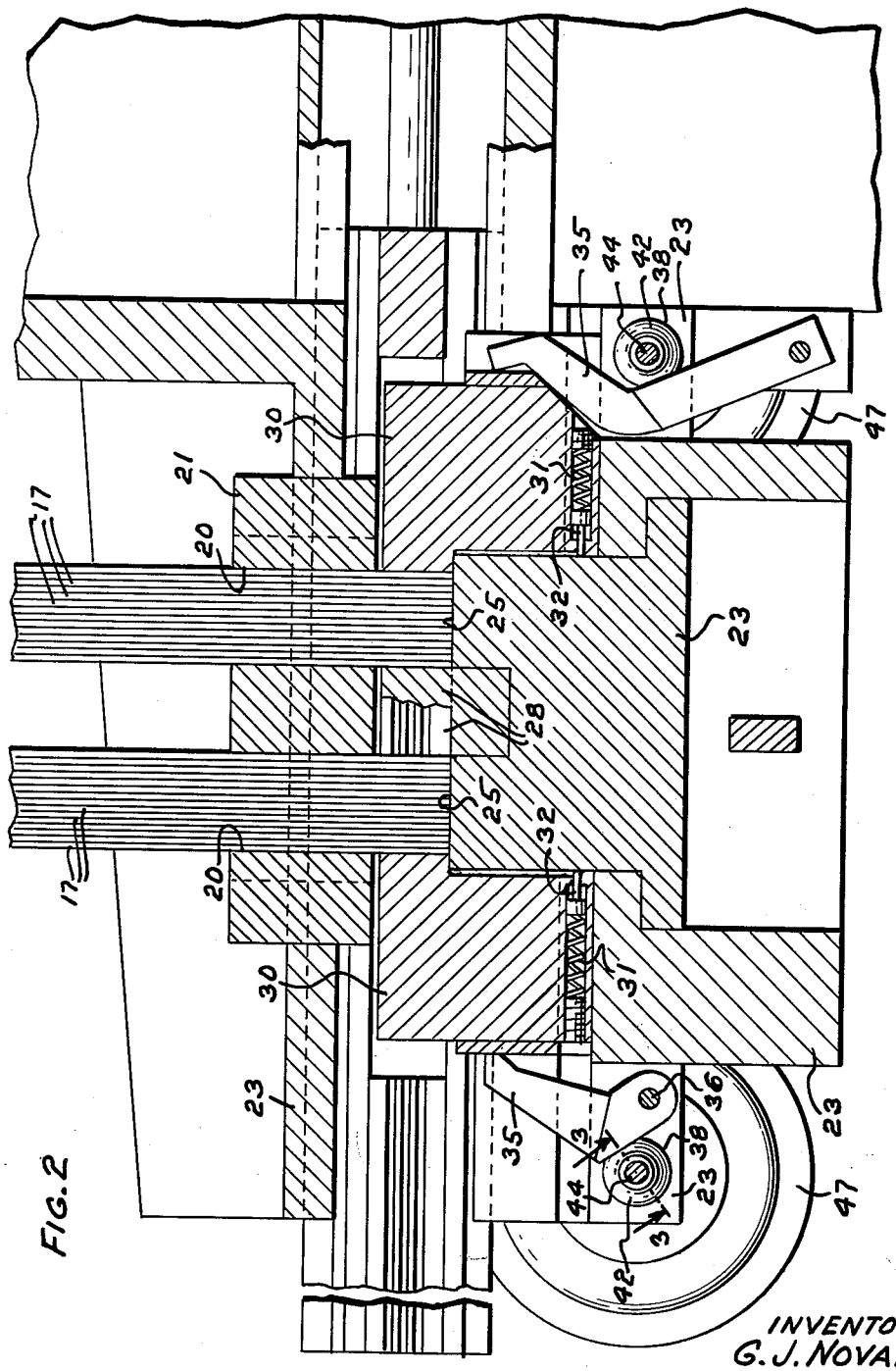
FIG. 2 is an enlarged vertical cross-sectional view through the structure taken on the line 2—2 of FIG. 1.

Referring to the drawings, the present clamping mechanism is shown applied to a broaching apparatus designed to broach piece parts of predetermined outline from flat strips 17 which are arranged in stacks. Two stacks of strips 17 are placed in guideways 20 (FIG. 2) of a guide 21 on a frame member 23 of the apparatus and rest on horizontal seats 25 thereon in engagement with opposite sides of a stationary jaw 28 and are clamped thereagainst by movable jaws 30. The movable jaws 30 are mounted for horizontal movement on the frame 23 and are urged by springs 31 and plungers 32 to normal open position and are actuated into clamping position by clamping members or levers 35.

Inasmuch as the mechanism for clamping the two stacks of strips 17 are the same, only one of them will be described in detail.

Figure 1:
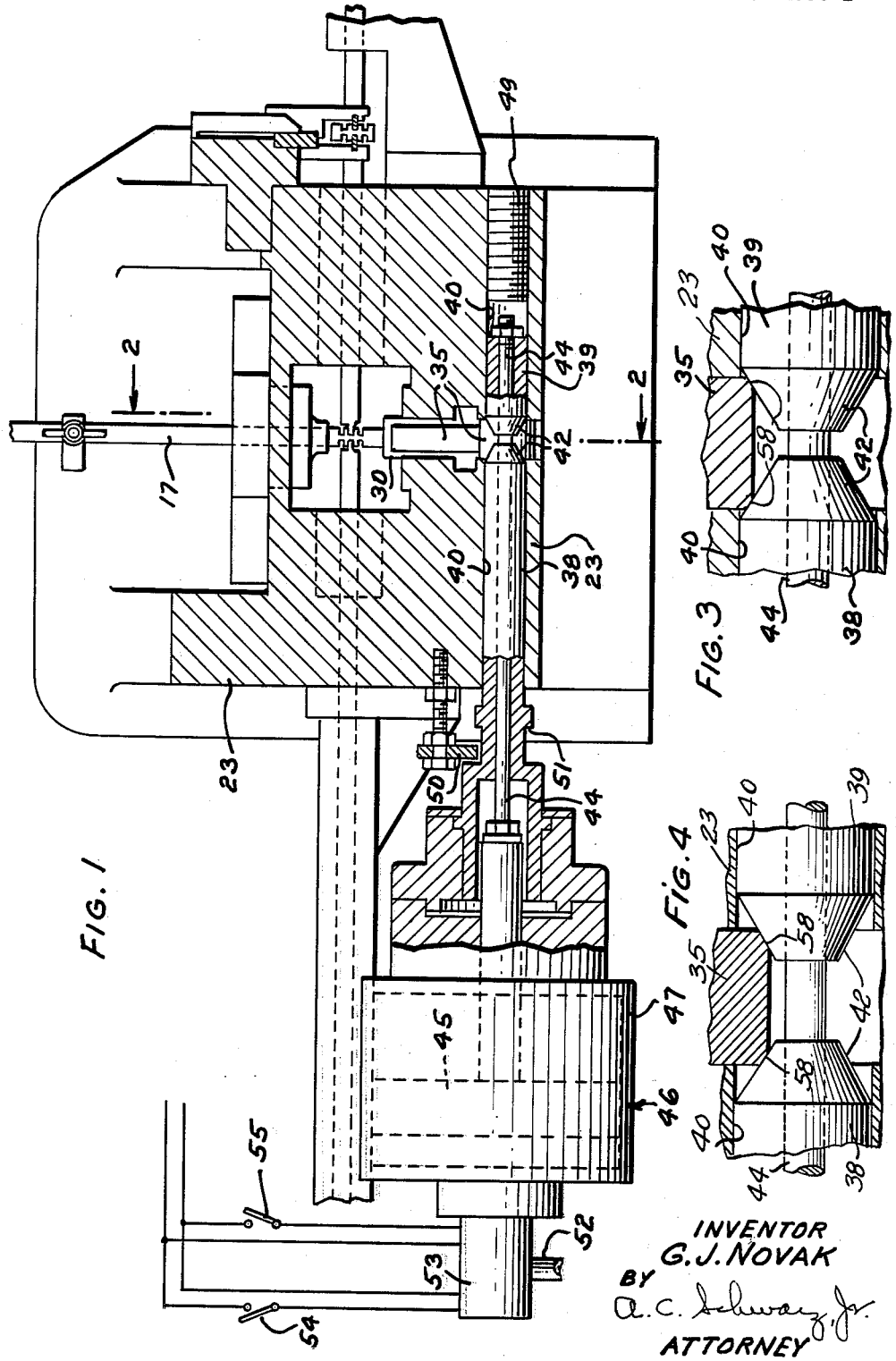
FIG. 1 is a vertical longitudinal cross-sectional view through the clamping mechanism as applied to a broaching machine.

The clamping lever 35 is mounted on the frame 23 for pivotal movement about a fixed pivot pin 36 and is actuated by a pair of power-operated actuating elements 38 and 39 (FIG. 1). The actuating elements are cylindrical in form and are slidably mounted in a bore 40 in the frame 23 on opposite sides of the lever 35 and have tapered end surfaces 42 engageable with the lever for imparting movement thereto.

The actuating element 39 is secured to the end of a piston rod 44 of a piston 45 of a fluid-operated actuator 46. The other actuating element 38, which is tubular and slidable on the piston rod 44, is secured to a cylinder 47 of the fluid-operated actuator 46 and supports the cylinder for reciprocatory movement. A plug 49 in the bore 40 serves as a stop for limiting the movement of the actuating element 39 away from the lever 35, and a stop member 50 fixedly mounted on the frame 23 cooperates with a shoulder 51 on the actuating element 38 to limit its movement away from the lever 35.

It will thus be seen that the cylinder 47, and the piston 45 and the actuating elements 38, 39 associated therewith are mounted on the frame 23 for movement relative to each other and to the frame along the axis of the piston rod 44 and transversely of the direction of movement of the lever 35 and the movable jaw 30. Movement is imparted to the actuating elements 38 and 39 by the admission of compressed air from a supply line 52 (FIG. 1) to opposite ends of the cylinder 47 under control of a solenoid actuated valve 53 mounted on one end of the actuator 46, and switches 54 and 55 associated therewith. The actuator 46 and control valve 53 therefor which is shown somewhat diagrammatically in FIG. 1 is a self-contained unit of a well known commercially available type.

After the stacks of strips 17 have been placed on the seats 25 of the broaching apparatus, the operator closes the switch 54 momentarily to effect the shifting of the valves 53 to one position and the flow of compressed air to the right-hand end of the cylinder 47 as viewed in FIG. 1. This effects a relative movement between the piston and the cylinder and causes the actuating elements 38 and 39 associated therewith to be moved from their fully open position (not shown) toward each other into engagement with the lever 35 at two corner surfaces 58 thereof. If one actuating element engages the lever 35 before the other actuating element, it is stopped thereby until the second actuating element engages the lever and the pressures exerted by the actuating elements against the lever are equalized. Thereafter, continued movement of the elements 38 and 39 toward each other from the position shown in FIG. 4 to the position shown in FIGS. 1 and 3 serves to impart movement to the lever 35 and to the movable jaw 30 to clamp the strips 17 against the fixed jaw 28 with a predetermined pressure.

After the strips have been broached, the switch 55 is closed manually in response to which the valve 53 is shifted to a second position to effect the flow of compressed air to the opposite end of the cylinder 47 and the movement of the actuating elements 38 and 39 away from each other and of the piston 45 and the cylinder 47 relative to each other in opposite directions and the movement from the lever 35 thus permitting the springs 31 to return the movable jaw 30 and the lever 35 to their unclamped positions.

Although the clamping of the stack of strips 17 in the present disclosure is effected by the actuating elements 38 and 39 through the medium of the clamping lever 35 and the jaw 30 it will be understood that the lever 35 could be used to engage and clamp the strips 17 directly or that the lever could be eliminated and the actuating elements 38 and 39 could be used to engage and actuate the jaw 30 directly.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A clamping mechanism comprising:
mounting means for supporting an article;
clamping means supported on said mounting means for movement along a predetermined first path for effecting the clamping of the article;
a pair of opposed actuating elements supported on said mounting means on opposite sides of said clamping means for movement relative to one another and to said clamping means along a second path transversely of the first path, said actuating elements having opposing beveled surfaces for imparting movement to said clamping means along said first path; and
means interconnecting said actuating elements and supported thereby for moving said elements toward each other and imparting movement to said clamping means.

2. A clamping mechanism comprising:
mounting means for supporting an article;
a member movably supported on said mounting means for movement along a predetermined first path for effecting the clamping of the article;
a pair of opposed actuating elements supported on said mounting means on opposite sides of said clamping member for movement relative to one another and to said clamping member along a second path transversely of the first path, said actuating elements having opposing beveled surfaces for engaging said clamping member therebetween and imparting movement to said clamping member along said first path;
power-operated means interconnecting said actuating elements and mounted for movement therewith to actuate said elements into engagement with said clamping member to effect the movement of said clamping member to clamping position; and
control means for rendering said power-operated means operative.

3. A clamping mechanism comprising:
mounting means having a seat for supporting an article thereon;
a clamping member movably supported on said mounting means for movement along a first path to effect the clamping of the article on said seat;
a pair of opposed actuating elements supported on said mounting means on opposite sides of said clamping member for movement relative to each other and to said clamping member along a second path perpendicular to the movement of said clamping member, said actuating elements having opposing beveled surfaces for engaging said clamping member therebetween and imparting movement to said clamping member along said first path;
a piston and a cylinder therefor connected individually to said actuating elements and supported thereby for movement relative to each other; and
means for selectively admitting fluid under pressure to opposite ends of said cylinder.

4. A clamping mechanism comprising:
mounting means for supporting an article;
a clamping lever pivotally supported at one end on said mounting means for movement of the other end thereof along a predetermined path to effect the clamping of the article;
a tubular first actuating element having a beveled end surface engageable with said lever;
a cylindrical second actuating element having a beveled end surface engageable with said lever;
said mounting means having a bore for supporting said elements for movement relative to each other along a fixed axis disposed perpendicular to the path of movement of said lever and with said beveled ends in opposed relation to each other and on opposite sides of said lever;
a cylinder secured to said tubular actuating element for movement therewith;
a piston reciprocable within said cylinder and having a piston rod extending through said tubular element and fixedly secured to said cylindrical element for movement therewith; and
means for effecting relative movement between said piston and said cylinder.

5. A clamping mechanism comprising:
mounting means for supporting an article;
a clamping member supported on said mounting means for movement along a first path to effect the clamping of the article;
a tubular first actuating element having a beveled end surface engageable with said clamping member;
a cylindrical second actuating element having a beveled end surface engageable with said clamping member, said mounting means having a bore for supporting said actuating elements for movement relative to each other along a fixed axis disposed perpendicular to the path of movement of said clamping member and with said beveled ends in opposed relation to each other and on opposite sides of said clamping member;
a cylinder secured to said first actuating element for movement therewith;
a piston reciprocable within said cylinder and having a piston rod extending through said tubular element and fixedly secured to said second actuating element for movement therewith;
means for admitting fluid under pressure to said cylinder; and
means on said mounting means for limiting the axial movement of said actuating elements relative to said clamping member.

6. A clamping mechanism comprising:
mounting means having a seat for supporting an article thereon;
a clamping member movably supported on said mounting means for movement along a first path to effect the clamping of the article on said seat;
a pair of opposed actuating elements supported on said mounting means on opposite sides of said clamping member for movement relative to each other and to said clamping member along a second path perpendicular to the movement of said clamping member;
said clamping member having a pair of surfaces engageable with said actuating elements, and said actuating elements having a pair of surfaces engageable with said surfaces of said clamping member, one of said pair of surfaces being disposed obliquely to said paths of movement to effect the movement of said clamping member in response to movement of said actuating elements toward each other; and
means for effecting the actuation of said actuating elements including a piston and a cylinder connected individually to said actuating elements and supported thereby for movement relative to one another.

References Cited by the Examiner
UNITED STATES PATENTS

| | | | |
|---|---|---|---|
| 2,416,228 | 2/47 | Sheppard | 269—234 X |
| 2,443,775 | 6/48 | Olson | 269—32 |
| 2,850,926 | 9/58 | Jobe | 269—234 X |

ROBERT C. RIORDON, *Primary Examiner.*